United States Patent
Lin et al.

(10) Patent No.: US 10,921,935 B2
(45) Date of Patent: Feb. 16, 2021

(54) INTERACTIVE PROJECTION SYSTEM AND INTERACTIVE PROJECTION METHOD

(71) Applicants: Xiu-Yu Lin, Taipei (TW); Chiao-Tsu Chiang, Taipei (TW); Ting-Hsiang Lan, Taipei (TW); Ya-Fang Hsu, Taipei (TW)

(72) Inventors: Xiu-Yu Lin, Taipei (TW); Chiao-Tsu Chiang, Taipei (TW); Ting-Hsiang Lan, Taipei (TW); Ya-Fang Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/417,653

(22) Filed: May 21, 2019

(65) Prior Publication Data

US 2020/0257406 A1    Aug. 13, 2020

Related U.S. Application Data

(60) Provisional application No. 62/674,577, filed on May 21, 2018.

(51) Int. Cl.
| | | |
|---|---|---|
| *G06F 3/042* | (2006.01) | |
| *G06T 7/50* | (2017.01) | |
| *G06T 3/40* | (2006.01) | |
| *G06T 3/60* | (2006.01) | |
| *A63F 13/525* | (2014.01) | |
| *A63F 13/23* | (2014.01) | |

(Continued)

(52) U.S. Cl.
CPC ............ *G06F 3/0425* (2013.01); *G06T 3/40* (2013.01); *G06T 3/60* (2013.01); *G06T 7/50* (2017.01)

(58) Field of Classification Search
CPC . G06F 3/0425; G06T 3/40; G06T 7/50; G06T 3/60
See application file for complete search history.

(56) References Cited

U.S. PATENT DOCUMENTS

| | | | | |
|---|---|---|---|---|
| 8,902,158 B2 * | 12/2014 | Willis | ................... | G06F 3/0425 |
| | | | | 345/156 |
| 9,569,001 B2 * | 2/2017 | Mistry | ................. | H04N 9/3173 |
| 10,657,694 B2 * | 5/2020 | Sharma | ................. | G06F 3/0425 |

(Continued)

FOREIGN PATENT DOCUMENTS

| | | |
|---|---|---|
| CN | 105830439 | 8/2016 |
| CN | 107846582 | 3/2018 |
| CN | 107925739 | 4/2018 |

OTHER PUBLICATIONS

"Office Action of Taiwan Counterpart Application", dated Apr. 6, 2020, p. 1-p. 7.

*Primary Examiner* — Vinh T Lam
(74) *Attorney, Agent, or Firm* — JCIPRNET

(57) ABSTRACT

An interactive projection system and an interactive projection method are provided. The interactive projection method includes: generating a virtual canvas by a projector; detecting a handheld device corresponding to a virtual scene by using a depth camera; and projecting a first virtual image corresponding to the virtual scene onto the virtual canvas and projecting a second virtual image corresponding to the virtual scene onto the handheld device in response to the handheld device detected by the depth camera, wherein the second virtual image is different from the first virtual image.

14 Claims, 9 Drawing Sheets

(51) Int. Cl.
*A63F 13/24* (2014.01)
*H04N 9/31* (2006.01)

(56) References Cited

U.S. PATENT DOCUMENTS

| | | | |
|---|---|---|---|
| 2015/0179147 A1* | 6/2015 | Rezaiifar | G06F 1/1694 |
| | | | 345/625 |
| 2018/0143757 A1* | 5/2018 | Champion | H04N 1/00962 |
| 2018/0191990 A1* | 7/2018 | Motoyama | A63F 13/00 |
| 2019/0075148 A1* | 3/2019 | Nielsen | H04N 21/2668 |
| 2019/0206131 A1* | 7/2019 | Kamal | H04N 9/3185 |
| 2019/0347766 A1* | 11/2019 | Kawaguchi | H04N 5/23238 |

* cited by examiner

INTERACTIVE PROJECTION SYSTEM AND INTERACTIVE PROJECTION METHOD

CROSS-REFERENCE TO RELATED APPLICATION

This application claims the priority benefit of U.S. provisional application Ser. No. 62/674,577, filed on May 21, 2018. The entirety of the above-mentioned patent application is hereby incorporated by reference herein and made a part of specification.

TECHNICAL FIELD

The invention relates to a projection system and a projection method, and more particularly, to an interactive projection system and an interactive projection method.

BACKGROUND

With the development of technology, interactive projectors that can interact with users are becoming more and more popular. The interactive projector can capture user movements, and thereby allow the user to interact with a virtual scene projected by the interactive projector. Nonetheless, finding a way to provide users with a more diverse interactive experience through the interactive projector is still one of the goals to be achieved by persons skilled in the art.

SUMMARY

The invention provides an interactive projection system and an interactive projection method.

The projection system of the invention includes a handheld device and a projector. The handheld device corresponds to a virtual scene. The projector includes a processing module, a light source module, a projection lens module, a depth camera and a storage medium. The light source module provides an illumination beam. The projection lens module converts the illumination beam into an image beam, and projects the image beam to generate a virtual canvas. The depth camera detects the handheld device. The storage medium stores a database associated with the virtual scene. The processing module is coupled to the light source module, the projection lens module, the depth camera and the storage medium. The processing module accesses the database in response to the handheld device detected by the depth camera, so as to project a first virtual image corresponding to the virtual scene onto the virtual canvas and project a second virtual image corresponding to the virtual scene onto the handheld device through the projection lens module, wherein the second virtual image is different from the first virtual image.

In an embodiment of the invention, the processing module refreshes the first virtual image and the second virtual image according to at least one of a displacement and a rotation of the handheld device.

In an embodiment of the invention, the processing module enlarges or shrinks the second virtual image according to the depth value variation of the handheld device.

In an embodiment of the invention, the processing module enlarges or shrinks the second virtual image in response to the depth value variation of the handheld device exceeding a first threshold.

In an embodiment of the invention, the processing module adjusts a shape of the second virtual image in response to the rotation of the handheld device.

In an embodiment of the invention, the processing module adjusts the shape of the second virtual image in response to the rotation of the handheld device exceeding a second threshold.

In an embodiment of the invention, the processing module makes the first virtual image interact with the second virtual image in response to a difference between a first depth value of the virtual canvas and a second depth value of the handheld device less than a third threshold.

In an embodiment of the invention, the processing module refreshes the first virtual image and the second virtual image according to a first interactive mode in response to a presence of the rotation of the handheld device, and the processing module refreshes the first virtual image and the second virtual image according to a second interactive mode different from the first interactive mode in response to an absence of the rotation of the handheld device.

In an embodiment of the invention, the first virtual image includes a virtual object and the processing module transfers the virtual object from the first virtual image to the second virtual image based on the first interactive mode.

The interactive projection method of the invention includes: generating a virtual canvas by a projector; detecting a handheld device corresponding to a virtual scene by using a depth camera; and projecting a first virtual image corresponding to the virtual scene onto the virtual canvas and projecting a second virtual image corresponding to the virtual scene onto the handheld device in response to the handheld device detected by the depth camera, wherein the second virtual image is different from the first virtual image.

In an embodiment of the invention, the interactive projection method further includes: refreshing the first virtual image and the second virtual image according to at least one of a displacement and a rotation of the handheld device.

In an embodiment of the invention, the interactive projection method further includes: enlarging or shrinking the second virtual image in response to a depth value variation of the handheld device.

In an embodiment of the invention, the interactive projection method further includes: enlarging or shrinking the second virtual image in response to the depth value variation of the handheld device exceeding a first threshold.

In an embodiment of the invention, the interactive projection method further includes: adjusting a shape of the second virtual image in response to the rotation of the handheld device.

In an embodiment of the invention, the interactive projection method further includes: adjusting the shape of the second virtual image in response to the rotation of the handheld device exceeding a second threshold.

In an embodiment of the invention, the interactive projection method further includes: making the first virtual image interact with the second virtual image in response to a difference between a first depth value of the virtual canvas and a second depth value of the handheld device less than a third threshold.

In an embodiment of the invention, the interactive projection method further includes: refreshing the first virtual image and the second virtual image according to a first interactive mode in response to a presence of the rotation of the handheld device; and refreshing the first virtual image and the second virtual image according to a second interactive mode different from the first interactive mode in response to an absence of the rotation of the handheld device.

In an embodiment of the invention, the first virtual image includes a virtual object, and the interactive projection method further includes: transferring the virtual object from the first virtual image to the second virtual image based on the first interactive mode.

Based on the above, compared to the conventional interactive projector, the interactive projection system of the invention can provide more types of virtual scenes for the user, and the user can interact with the virtual scene through the handheld device. In the virtual scene created by the interactive projector, the user is able to conduct activities like fishing goldfish, cooking or whack-a-mole. As a result, the user can experience diverse virtual scene by using the same hardware equipment.

To make the above features and advantages of the disclosure more comprehensible, several embodiments accompanied with drawings are described in detail as follows.

DETAILED DESCRIPTION

Figure 1:
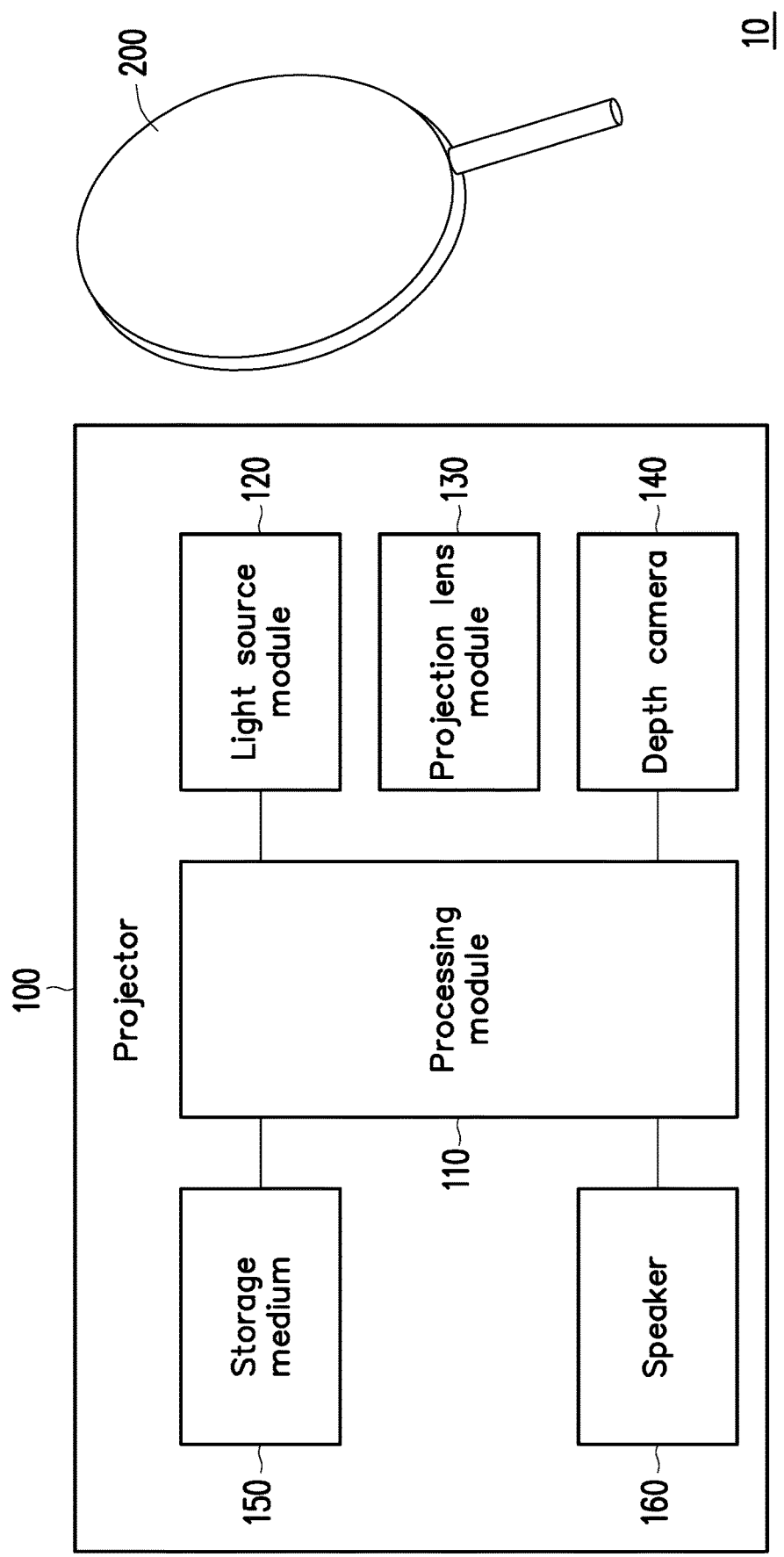
FIG. 1 illustrates a function block diagram of an interactive projection system according to an embodiment of the invention.

In order to make content of the invention more comprehensible, embodiments are described below as the examples to prove that the invention can actually be realized. Moreover, elements/components/steps with same reference numerals represent same or similar parts in the drawings and embodiments.

FIG. 1 illustrates a function block diagram of an interactive projection system 10 according to an embodiment of the invention. With reference to FIG. 1, the interactive projection system 10 includes a projector 100 and a handheld device 200. The projector 100 includes a processing module 110, a light source module 120, a projection lens module 130, a depth camera 140 and a storage medium 150.

The processing module 110 is coupled to the light source module 120, the projection lens module 130, the depth camera 140 and the storage medium 150. The processing module 110 is, for example, a central processing unit (CPU) or other programmable micro control units (MCU) for general purpose or special purpose such as a microprocessor, a digital signal processor (DSP), a programmable controller, an application specific integrated circuit (ASIC), a graphics processing unit (GPU), an arithmetic logic unit (ALU) other similar elements or a combination of above-mentioned elements.

The light source module 120 provides an illumination beam. The projection lens module 130 is controlled by the processing module 110 to convert the illumination beam into an image beam and project the image beam onto a projection surface to generate a virtual canvas 300 as shown by FIG. 3B. The processing module 110 may be disposed with the light source module 120 and the projection lens module 130 to project a virtual scene or a virtual object onto the virtual canvas 300.

The depth camera 140 is, for example, an infrared radiation (IR) camcorder, but the invention is not limited thereto. In this embodiment, the depth camera 140 is configured to detect the handheld device 200 appeared on a path of the image beam projected by the projection lens module 130 so the processing module 110 can create the virtual scene through the image beam projected by the projection lens module 130 in response to the handheld device 200 detected. The depth camera 140 may also detect information regarding a depth value, a displacement or a rotation of the handheld device 200. The processing module 110 can refresh the image beam projected by the projection lens module 130 according to the depth value, the displacement or the rotation of the handheld device 200. In this way, the user can use the handheld device 200 to interact with the virtual scene or the virtual object on the virtual canvas 300.

The storage medium 150 may be, for example, a random access memory (RAM), a read-only memory (ROM), a flash memory, a hard disk drive (HDD), a hard disk drive (HDD), a solid state drive (SSD) or other similar elements in any stationary or movable form, or a combination of the above-mentioned elements. In this embodiment, the storage medium 150 stores a database associated with a plurality of different virtual scenes.

The handheld device 200 is an object having a surface that images can be projected on. For instance, the handheld device 200 may look similar to a table tennis bat. In certain embodiments, the handheld device 200 corresponds to a specific virtual scene. The processing module 110 can identify the handheld device 200 and determine the virtual scene corresponding to the handheld device 200 through the depth camera 140. Then, the processing module 110 can access the virtual scene corresponding to the handheld device 200 from the database in the storage medium 150. The processing module 110 can create the virtual scene corresponding to the handheld device 200 through the image beam projected by the projection lens module 130 in response to the handheld device 200 identified.

For instance, if the surface of the handheld device 200 is printed with a pattern of a fishing net, the processing module 110 can identify that the virtual scene corresponding to the handheld device 200 is a goldfish pond through the depth camera 140. If the surface of the handheld device 200 is printed with a pattern of a shovel, the processing module 110 can identify that the virtual scene corresponding to the handheld device 200 is a garden through the depth camera 140.

In certain embodiments, the interactive projection system 10 further includes a speaker 160 coupled to the processing module 110. After the virtual scene corresponding to the handheld device 200 is created by the processing module 110, the speaker 160 can play a sound effect associated with the virtual scene.

Figure 2:
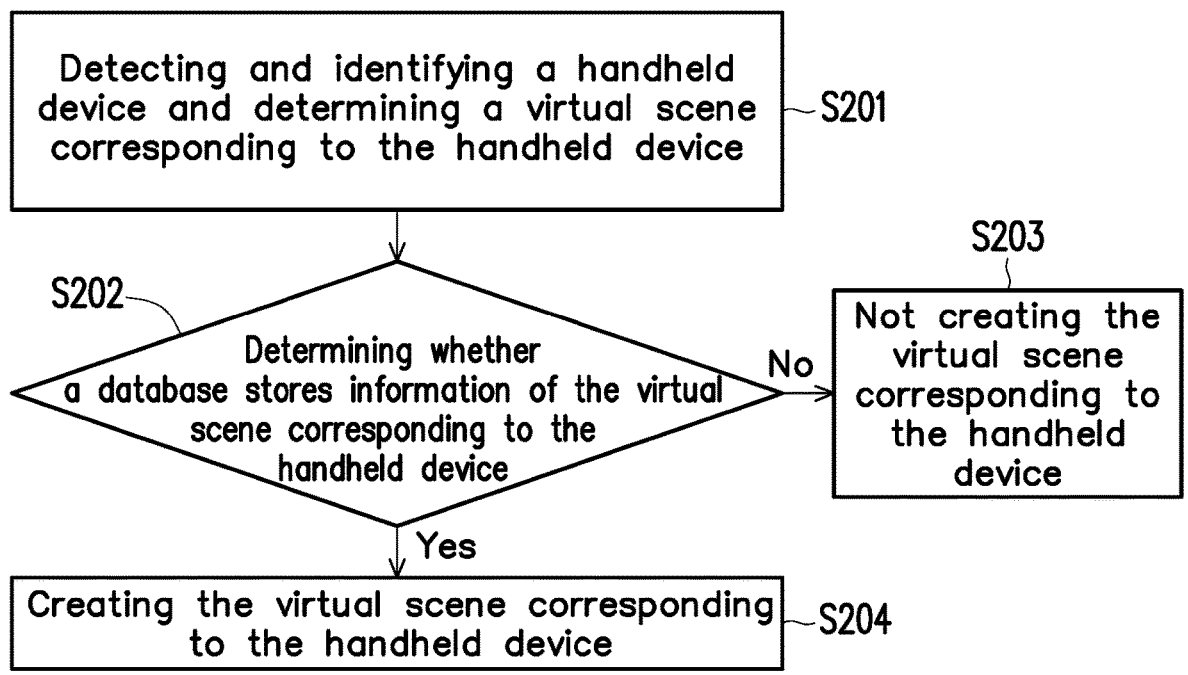
FIG. 2 illustrates a flowchart for determining the virtual scene by the interactive projection system according to an embodiment of the invention.

FIG. 2 illustrates a flowchart for determining the virtual scene by the interactive projection system 10 according to an embodiment of the invention. In step S201, the processing module 110 detects and identifies the handheld device 200 and determines the virtual scene corresponding to the handheld device 200 through the depth camera 140. For instance, the processing module 110 can determine the virtual scene corresponding to the handheld device 200 according to a pattern printed on the surface of the handheld device 200, a shape of the handheld device 200 or a tag on the handheld device 200 (e.g., a radio frequency identification (RF ID) or a QR Code).

In step S202, the processing module 110 determines whether the database in the storage medium 150 stores information of the virtual scene corresponding to the handheld device 200. If the database does not store the information of the virtual scene corresponding to the handheld device 200, the process proceeds to step S203. If the database stores the information of the virtual scene corresponding to the handheld device 200, the process proceeds to step S204. In step S203, the processing module 110 determines not to create the virtual scene corresponding to the handheld device 200. In step S204, the processing module 110 determines to create the virtual scene corresponding to the handheld device 200.

Figure 3A:
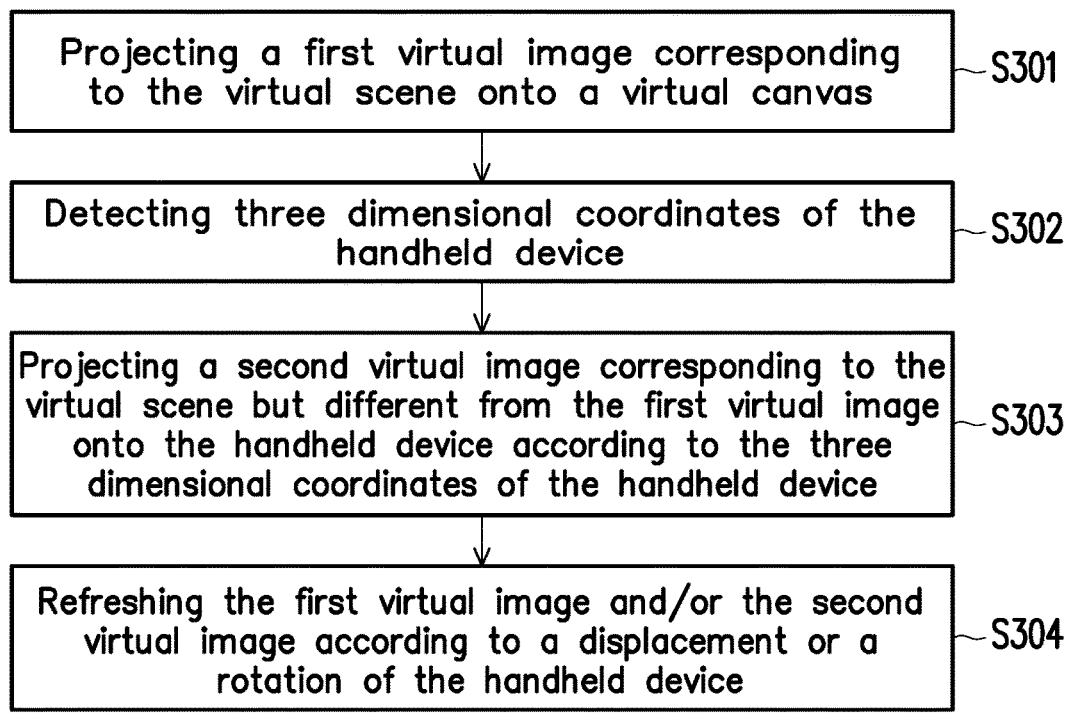
FIG. 3A illustrates a flowchart for creating the virtual scene according to an embodiment of the invention.

FIG. 3A illustrates a flowchart for creating the virtual scene according to an embodiment of the invention. Here, steps in FIG. 3A may be implemented by the interactive projection system 10 shown by FIG. 1. After the virtual scene corresponding to the handheld device 200 is determined by the processing module 110, in step S301, the processing module 110 projects a first virtual image 310 corresponding to the virtual scene onto the virtual canvas 300 through the projection lens module 130. Here, the first virtual image 310 may include one or more virtual objects. At the same time, the first virtual image 310 is also projected onto the handheld device 200 located on the path of the image beam projected by the projection lens module 130.

With FIG. 3B as an example, FIG. 3B illustrates a schematic diagram for projecting the first virtual image 310 according to an embodiment of the invention. For instance, if the processing module 110 identifies that the virtual scene corresponding to the handheld device 200 is the goldfish pond through the depth camera 140, the processing module 110 can project the first virtual image 310 displayed as the goldfish pond onto the virtual canvas 300 through the projection lens module 130, wherein the first virtual image 310 may include a virtual object 311 displayed as a goldfish. Meanwhile, the first virtual image 310 displayed as the goldfish is also projected onto the handheld device 200. As another example, if the processing module 110 identifies that the virtual scene corresponding to the handheld device 200 is the garden through the depth camera 140, the processing module 110 can project the first virtual image 310 displayed as a soil onto the virtual canvas 300 through the projection lens module 130, wherein the first virtual image 310 may include the virtual object 311 displayed as a seedling.

Meanwhile, the first virtual image 310 displayed as the soil is also projected onto the handheld device 200.

Referring back to FIG. 3A, in step S302, the processing module 110 detects three dimensional coordinates of the handheld device 200 through the depth camera 140, wherein the three dimensional coordinates may include a depth value of the handheld device 200.

Figure 3C:
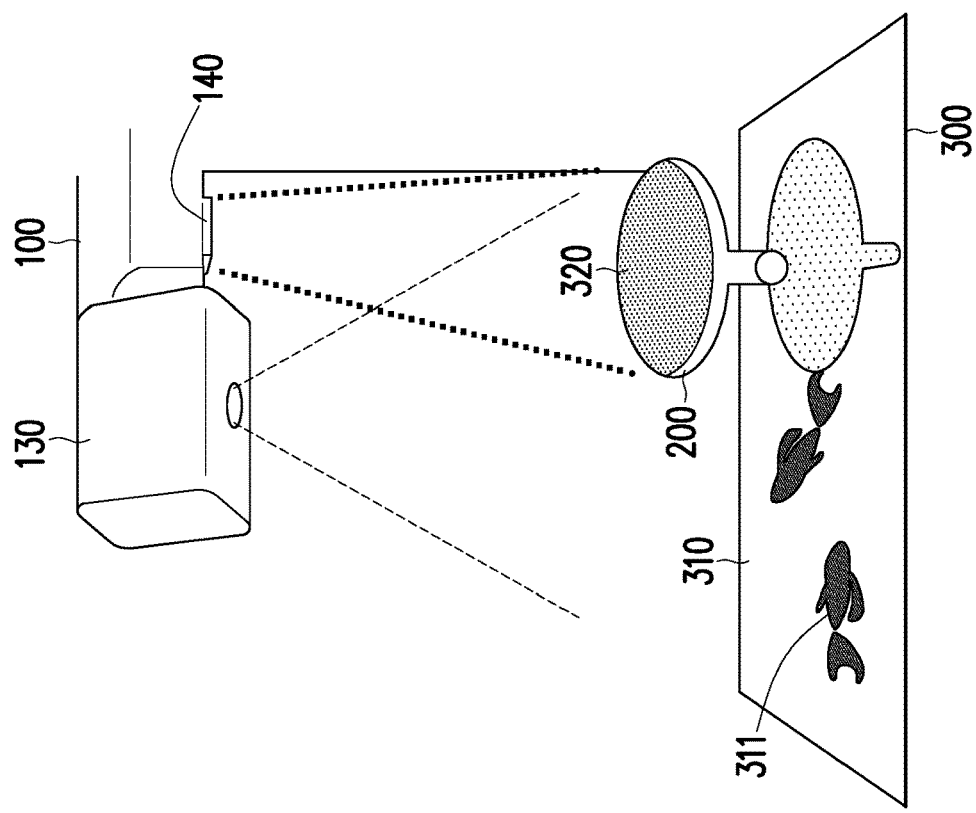
FIG. 3C illustrates a schematic diagram for projecting the second virtual image according to an embodiment of the invention.
Figure 3B:
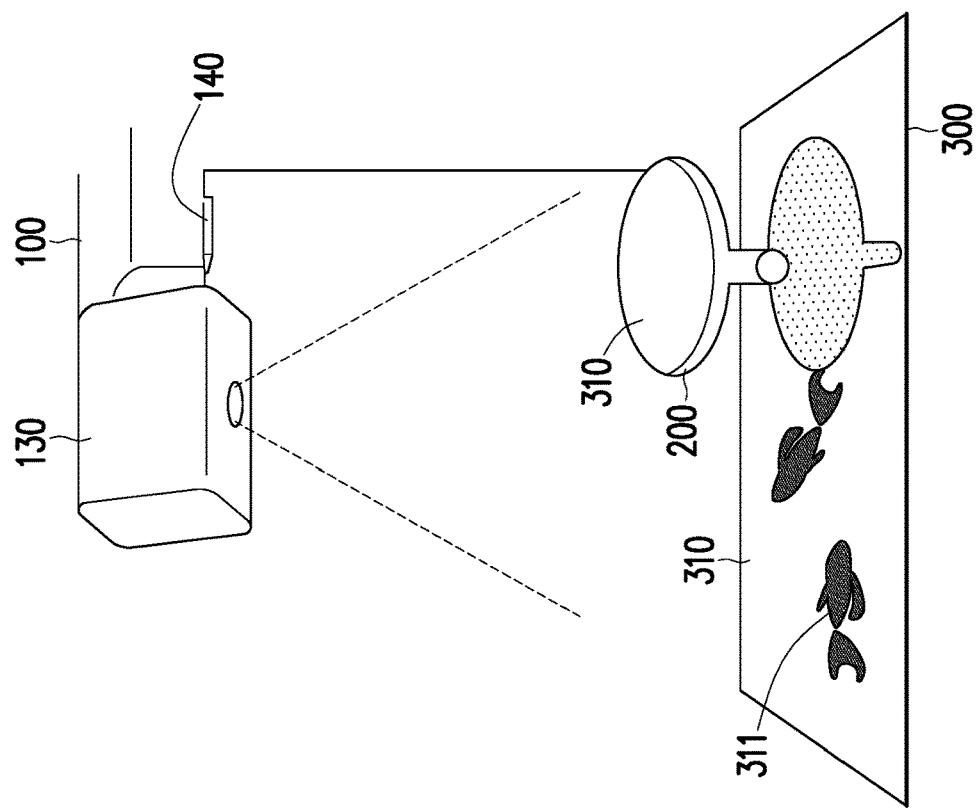
FIG. 3B illustrates a schematic diagram for projecting the first virtual image according to an embodiment of the invention.

In step S303, the processing module 110 projects a second virtual image 320 corresponding to the virtual scene but different from the first virtual image 310 onto the handheld device 200 through the projection lens module 130 according to the three dimensional coordinates of the handheld device 200, as shown by FIG. 3C. FIG. 3C illustrates a schematic diagram for projecting the second virtual image 320 according to an embodiment of the invention. Referring to FIGS. 3B and 3C, the first virtual image 310 projected on the handheld device 200 shown by FIG. 3B is replaced by the second virtual image 320 shown by FIG. 3C. For instance, if the virtual scene corresponding to the handheld device 200 is the goldfish pond, the processing module 110 can project the second virtual image 320 displayed as the fishing net onto the handheld device 200 through the projection lens module 130.

Referring back to FIG. 3A, in step S304, the processing module 130 refreshes the first virtual image 310 and/or the second virtual image 320 according to the displacement or the rotation of the handheld device 200. For instance, the processing module 130 can refresh the first virtual image 310 and/or the second virtual image 320 through a method disclosed by FIG. 4A or 5A.

Figure 4A:
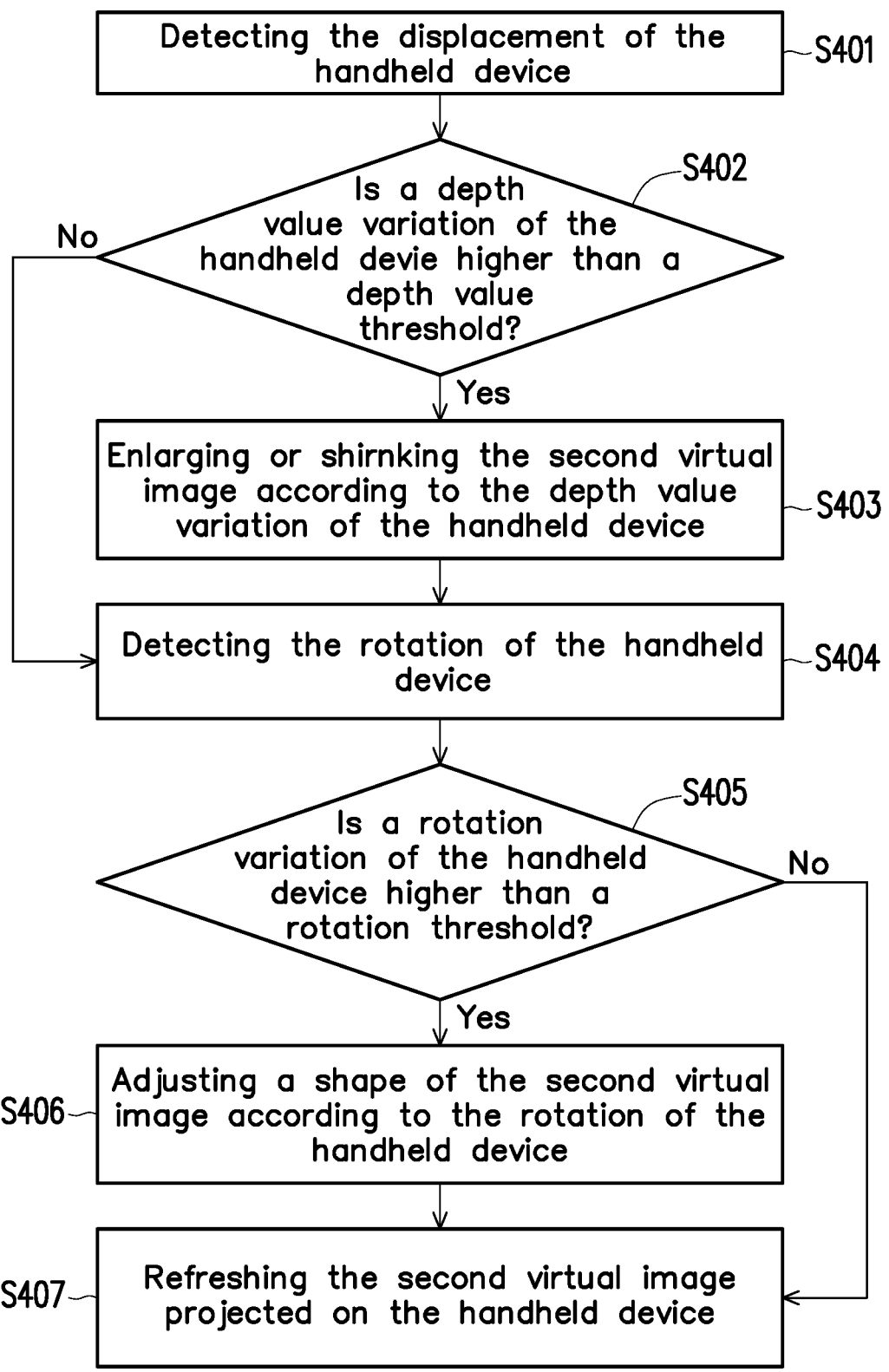
FIG. 4A illustrates a flowchart for refreshing the second virtual image according to an embodiment of the invention.
Figure 4C:
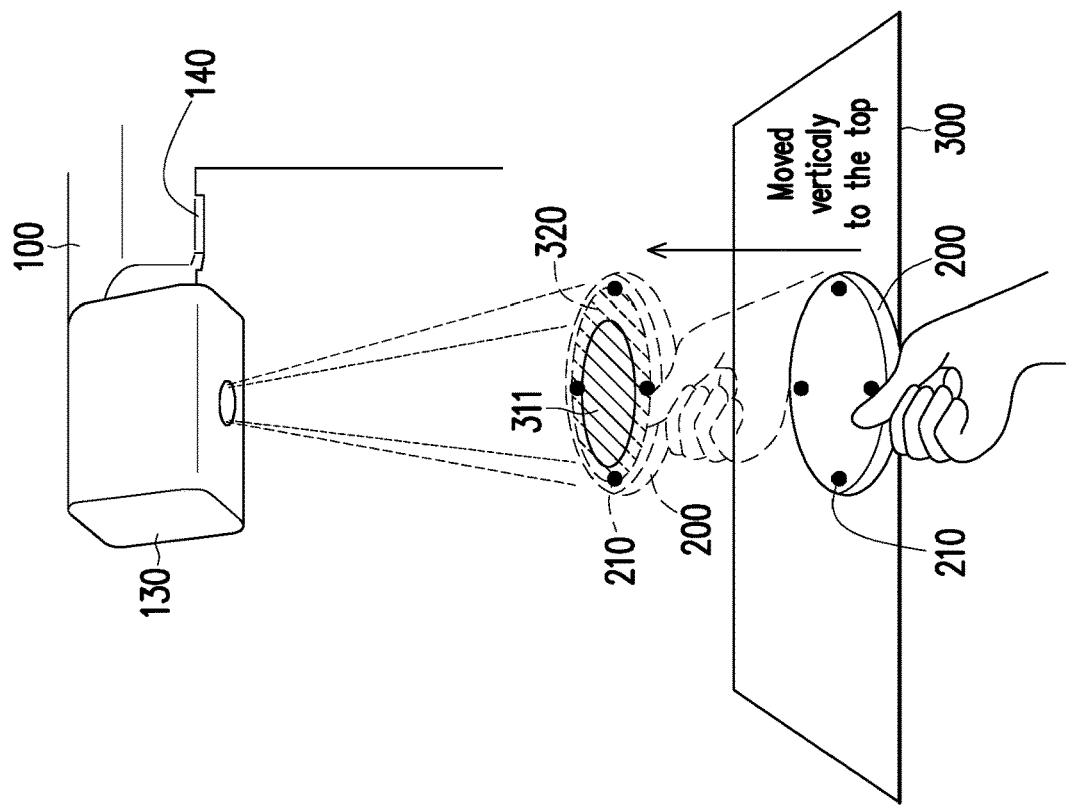
FIG. 4C illustrates a schematic diagram of the handheld device moved vertically according to an embodiment of the invention.
Figure 4B:
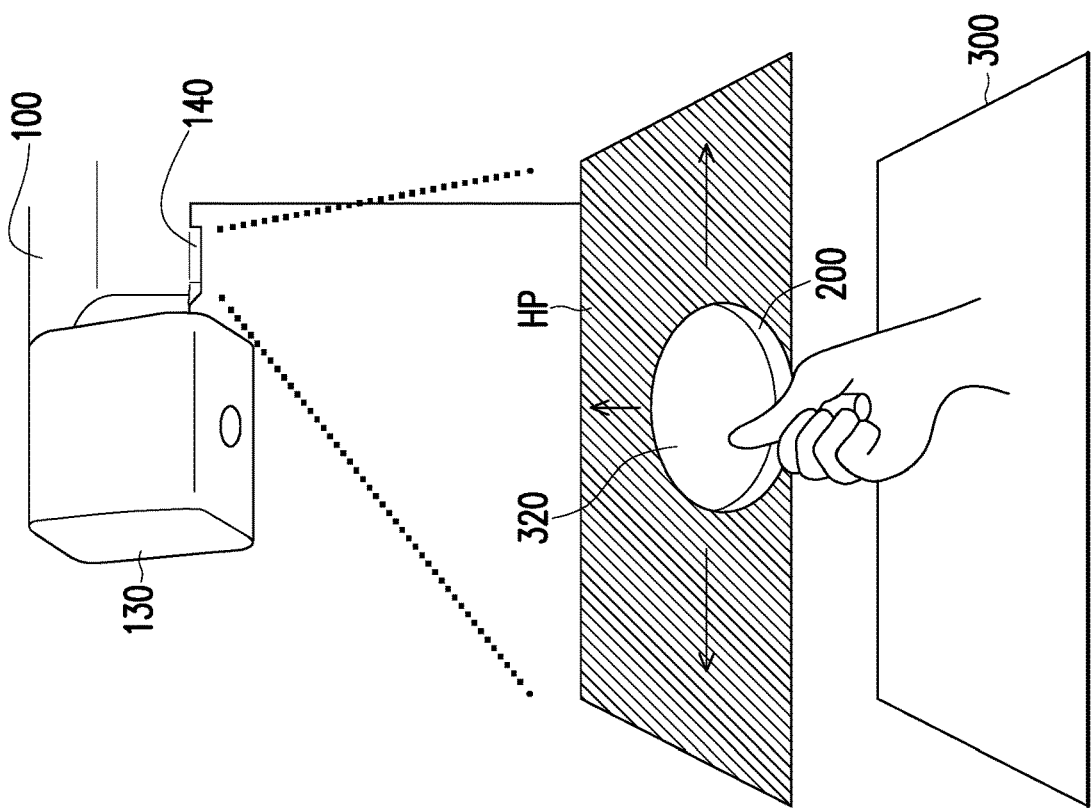
FIG. 4B illustrates a schematic diagram of the handheld device moved horizontally according to an embodiment of the invention.

FIG. 4A illustrates a flowchart for refreshing the second virtual image 320 according to an embodiment of the invention. Here, steps in FIG. 4A may be implemented by the interactive projection system 10 shown by FIG. 1. In step S401, the processing module 110 detects the displacement of the handheld device 200 through the depth camera 140, wherein the displacement is, for example, a horizontal displacement or a vertical displacement. FIG. 4B illustrates a schematic diagram of the handheld device 200 moved horizontally according to an embodiment of the invention. In FIG. 4B, the handheld device 200 is moved horizontally on a two dimensional plane HP, wherein each point on the two dimensional plane HP has the same depth value. FIG. 4C illustrates a schematic diagram of the handheld device 200 moved vertically according to an embodiment of the invention. In FIG. 4C, when the handheld device 200 is moved vertically, the depth value of the handheld device 200 measured by the depth camera 140 will vary. In this embodiment, when the depth value of the handheld device 200 is higher, the handheld device 200 is closer to the virtual canvas 300. When the depth value of the handheld device 200 is lower, the handheld device 200 is farther away from the virtual canvas 300.

In certain embodiments, a positioning point may be printed on the handheld device 200 to assist the processing module 110 in detecting the displacement of the handheld device 200. With FIG. 4C as an example, a positioning point 210 on the handheld device 200 detected by the processing module 110 through the depth camera 140 becoming larger indicates that the handheld device 200 is moving towards the projection lens module 130 and away from the virtual canvas 300 (i.e., the depth value of the handheld device 200 is reduced). In other words, the processing module 110 can determine a depth value variation of the handheld device 200 according to a dimension change of the positioning point 210.

Referring back to FIG. 4A, in step S402, the processing module 110 determines whether the depth value variation of the handheld device 200 is higher than a depth value threshold. If the depth value variation of the handheld device 200 is higher than the depth value threshold, the process proceeds to step S403. If the depth value variation of the handheld device 200 is not higher than the depth value threshold, the process proceeds to step S404. Because the processing module 110 refreshes the second virtual image 320 projected on the handheld device 200 according to the depth value variation of the handheld device 200, if the user holding the handheld device 200 is unable to stably operate the handheld device 200 so that the depth value of the handheld device 200 is constantly changing, a refresh rate of the second virtual image 320 may be overly high. The depth value threshold may be configured to give the second virtual image 320 an appropriate refresh rate. For instance, the depth value threshold may be set to 0.5 cm. Accordingly, the processing module 110 can refresh the second virtual image 320 according to the depth value variation only when the depth value variation of the handheld device 200 exceeds 0.5 cm.

In step S403, the processing module 110 can enlarge or shrink the second virtual image 320 according to the depth value variation of the handheld device 200. With FIG. 4C as an example, the processing module 110 can enlarge the second virtual image 320 projected on the handheld device 200 when the depth value of the handheld device 200 becomes smaller (i.e., the handheld device 200 is moving towards the projection lens module 130 and away from the virtual canvas 300). If the second virtual image 320 includes the virtual object 311, the virtual object 311 will also be enlarged together. On the other hand, the processing module 110 can shrink the second virtual image 320 projected on the handheld device 200 when the depth value of the handheld device 200 becomes larger (i.e., the handheld device 200 is moving towards the virtual canvas 300 and away from the projection lens module 130). If the second virtual image 320 includes the virtual object 311, the virtual object 311 will also be shrunk together.

Figure 4E:
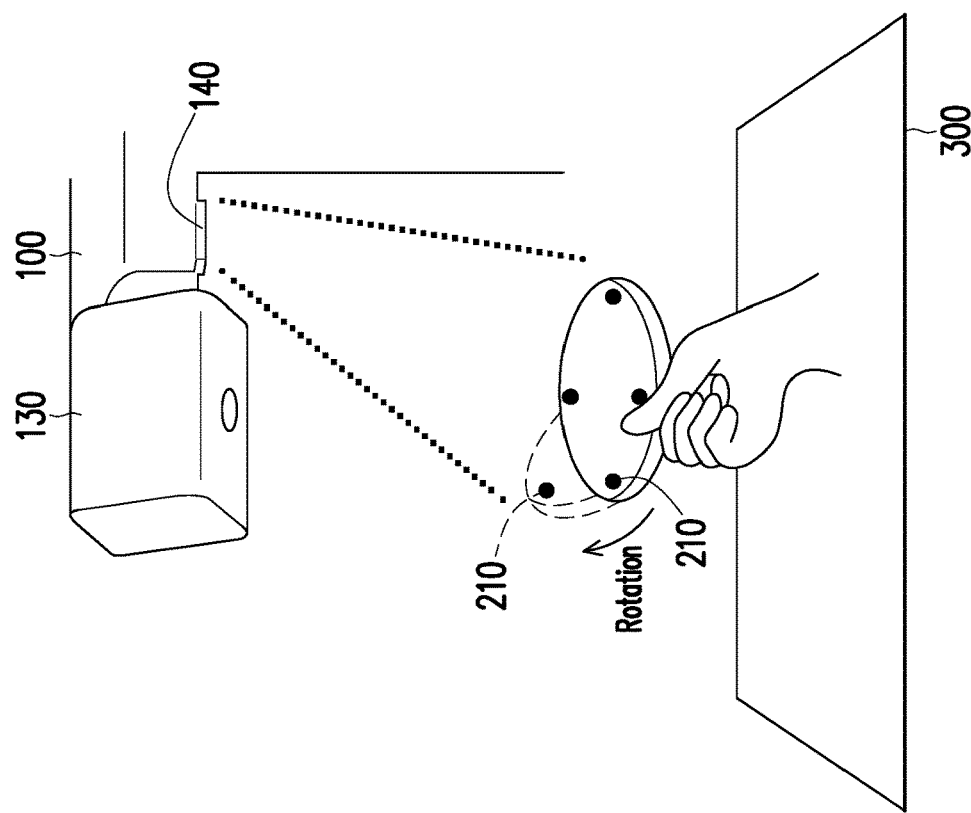
FIG. 4E illustrates a schematic diagram of the handheld device having the positioning point according to an embodiment of the invention.
Figure 4D:
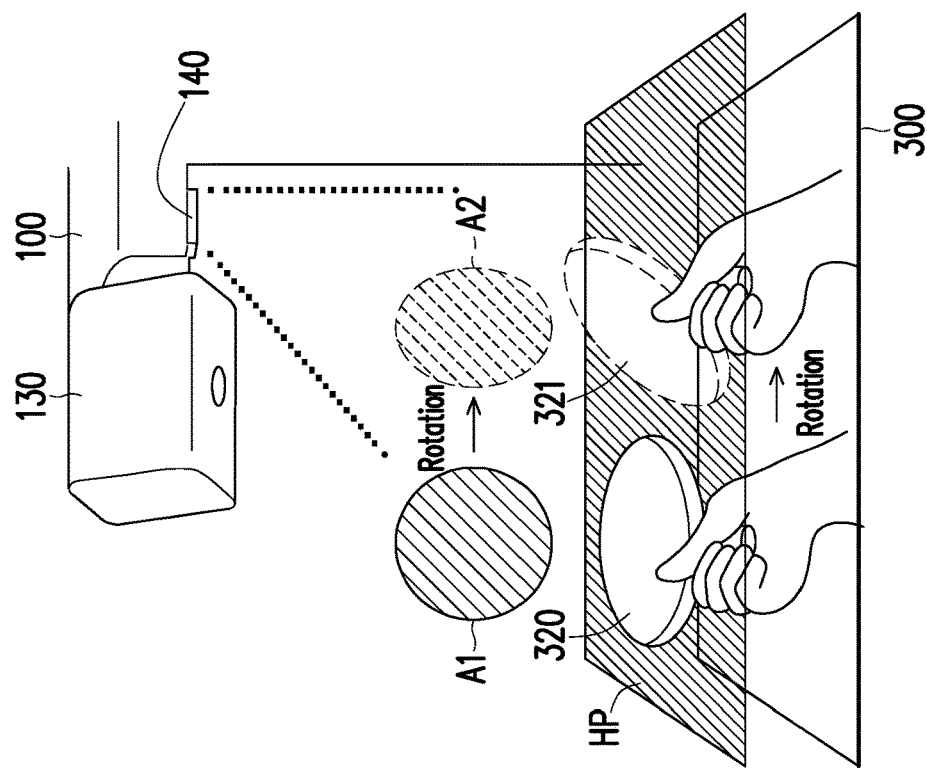
FIG. 4D illustrates a schematic diagram of the rotation of the handheld device according to an embodiment of the invention.

Referring back to FIG. 4A, in step S404, the processing module 110 detects the rotation of the handheld device 200 through the depth camera 140. For instance, the processing module 110 can determine whether the handheld device 200 is rotating according to a projected area variation of the handheld device 200 on the two dimensional plane HP. FIG. 4D illustrates a schematic diagram of the rotation of the handheld device 200 according to an embodiment of the invention. According to a projected area of the handheld device 200 on the two dimensional plane HP changed from a projected area A1 to a projected area A2, the processing module 110 can determine a presence of the rotation of the handheld device 200 and determine a rotation angle of the handheld device 200. FIG. 4E illustrates a schematic diagram of the handheld device 200 having the positioning point 210 according to an embodiment of the invention. In certain embodiments, the positioning point 210 may be used to assist the processing module 110 in determining the rotation of the handheld device 200. For instance, the processing module 110 can detect a coordinate variation of the positioning point 210 through the depth camera 140, and then determine the rotation angle of the handheld device 200 according to the coordinate variation of the positioning 210.

Referring back to FIG. 4A, in step S405, the procedure 110 determines whether a rotation variation of the handheld device 200 is higher than a rotation threshold. If the rotation variation of the handheld device 200 is higher than the rotation threshold, the process proceeds to step S406. If the rotation variation of the handheld device 200 is not higher than the rotation threshold, the process proceeds to step S407. Because the processing module 110 refreshes the second virtual image 320 projected on the handheld device 200 according to the rotation angle of the handheld device 200, if the user holding the handheld device 200 is unable to stably operate the handheld device 200 so that the depth value of the handheld device 200 is constantly rotating, the refresh rate of the second virtual image 320 may be overly high. The rotation threshold may be configured to give the second virtual image 320 the appropriate refresh rate. For instance, the depth value threshold may be set to 15 degrees. Accordingly, the processing module 110 can refresh the second virtual image 320 according to the rotation angle only when the rotation angle of the handheld device 200 exceeds 15 degrees.

In step S406, the processing module 110 adjusts a shape of the second virtual image 320 according to the rotation of the handheld device 200. With FIG. 4D as an example, after the handheld device 200 is rotated, the processing module 110 can adjust the second virtual image 320 projected on the handheld device 200 to a third virtual image 321 adapted for the rotated handheld device 200. For instance, if the second virtual image 320 is the fishing net, the third virtual image 321 may be a tilted fishing net.

Referring back to FIG. 4A, in step S407, the processing module 110 refreshes the second virtual image 320 projected on the handheld device 200. Specifically, the processing module 110 can update the second virtual image 320 according to execution results of step S403 and S403 (e.g., enlarging, shrinking or changing the shape of the second virtual image 320), and project the updated second virtual image 320 onto the handheld device 200.

It should be noted that, the order for executing steps S401 to S407 is not limited by the process shown in FIG. 4A. For instance, step S404 to S406 may be executed before the step S401 to S403 are executed, and the invention is not limited thereto.

Figure 5A:
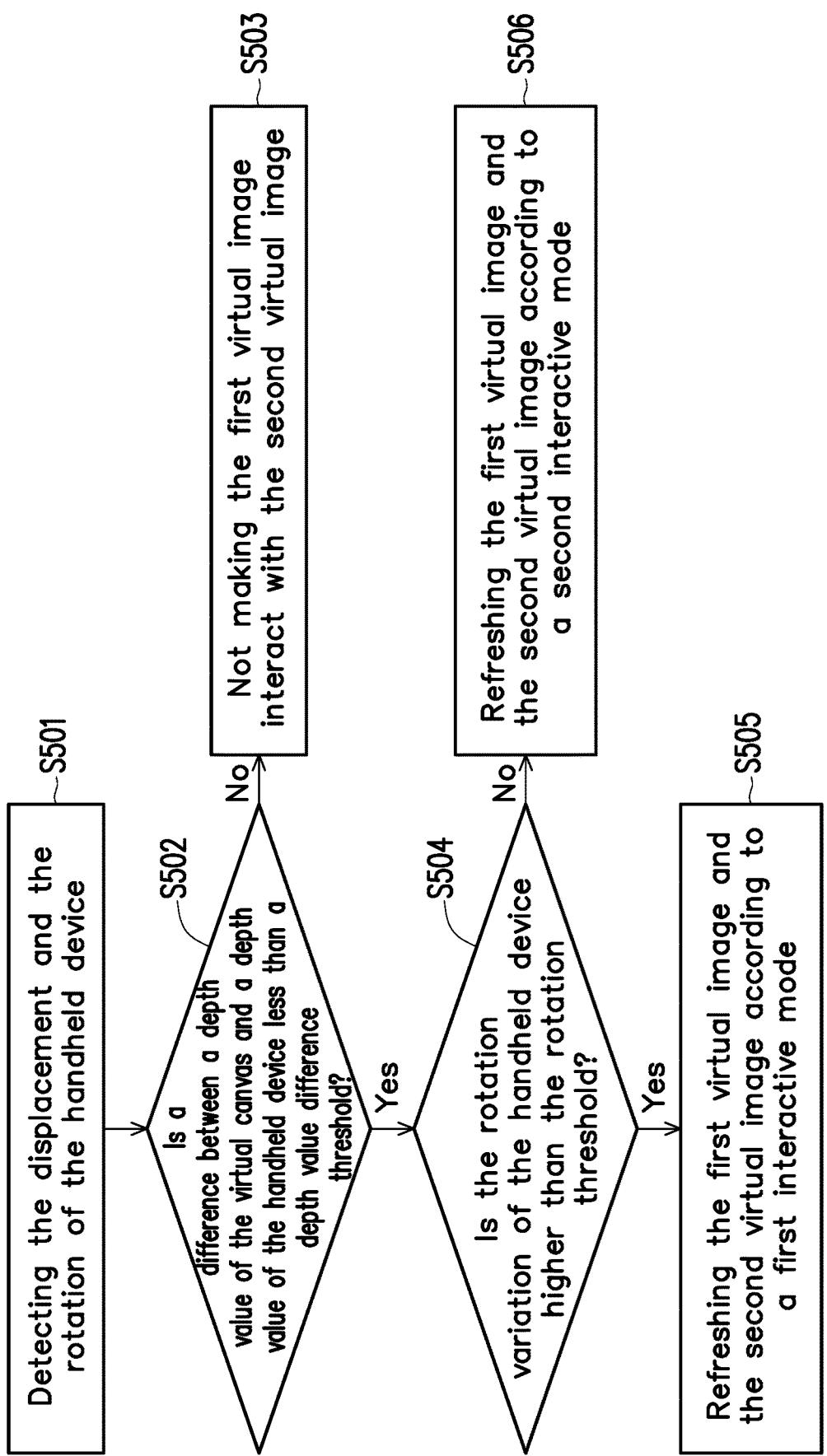
FIG. 5A illustrates a flowchart for making the first virtual image interact with the second virtual image according to an embodiment of the invention.

FIG. 5A illustrates a flowchart for making the first virtual image 310 interact with the second virtual image 320 according to an embodiment of the invention. Here, steps in FIG. 5A may be implemented by the interactive projection system 10 shown by FIG. 1. In step S501, the processing module 110 detects the displacement and the rotation of the handheld device 200 through the depth camera 140.

In step S502, the processing module 110 determines whether a difference between a depth value of the virtual canvas 300 and a depth value of the handheld device 200 is less than a depth value difference threshold. If the difference between the depth value of the virtual canvas 300 and the depth value of the handheld device 200 is less than the depth value difference threshold, the process proceeds to step S504. If the difference between the depth value of the virtual canvas 300 and the depth value of the handheld device 200 is not less than the depth value difference threshold, the process proceeds to step S503.

In step S503, the processing module 110 does not make the first virtual image 310 projected on the virtual canvas 300 interact with the second virtual image 320 projected on the handheld device 200.

For instance, if the first virtual image 310 is the goldfish pond and the second virtual image 320 is the fishing net, the difference between the depth value of the first virtual image 310 and the depth value of the second virtual image 320 being overly larger indicates that the fishing net is not in contact with a water surface of the goldfish pond. Therefore, the processing module 110 will configure the first virtual image 310 and the second virtual image 320 to not interact with each other. Relatively speaking, the difference between the depth value of the virtual canvas 300 and the depth value of the handheld device 200 less than the depth value difference threshold indicates that the fishing net is in contact with the water surface of the goldfish pond. Therefore, the processing module 110 will configure the first virtual image 310 and the second virtual image 320 to interact with each other.

In step S504, the processing module 110 determines whether the rotation variation of the handheld device 200 is higher than the rotation threshold. If the rotation variation of the handheld device 200 is higher than the rotation threshold, the process proceeds to step S505. If the rotation variation of the handheld device 200 is not higher than the rotation threshold, the process proceeds to step S506.

In step S505, the processing module 110 refreshes the first virtual image 310 and the second virtual image 320 according to a first interactive mode. In step S506, the processing module 110 refreshes the first virtual image 310 and the second virtual image 320 according to a second interactive mode, wherein the second interactive mode is different from the first interactive mode. In brief, the interactive mode of the handheld device 200 and the virtual canvas 300 when the handheld device 200 is rotated is different from the interactive mode of the handheld device 200 and the virtual canvas 300 when the handheld device 200 is not rotated.

Figure 5B:
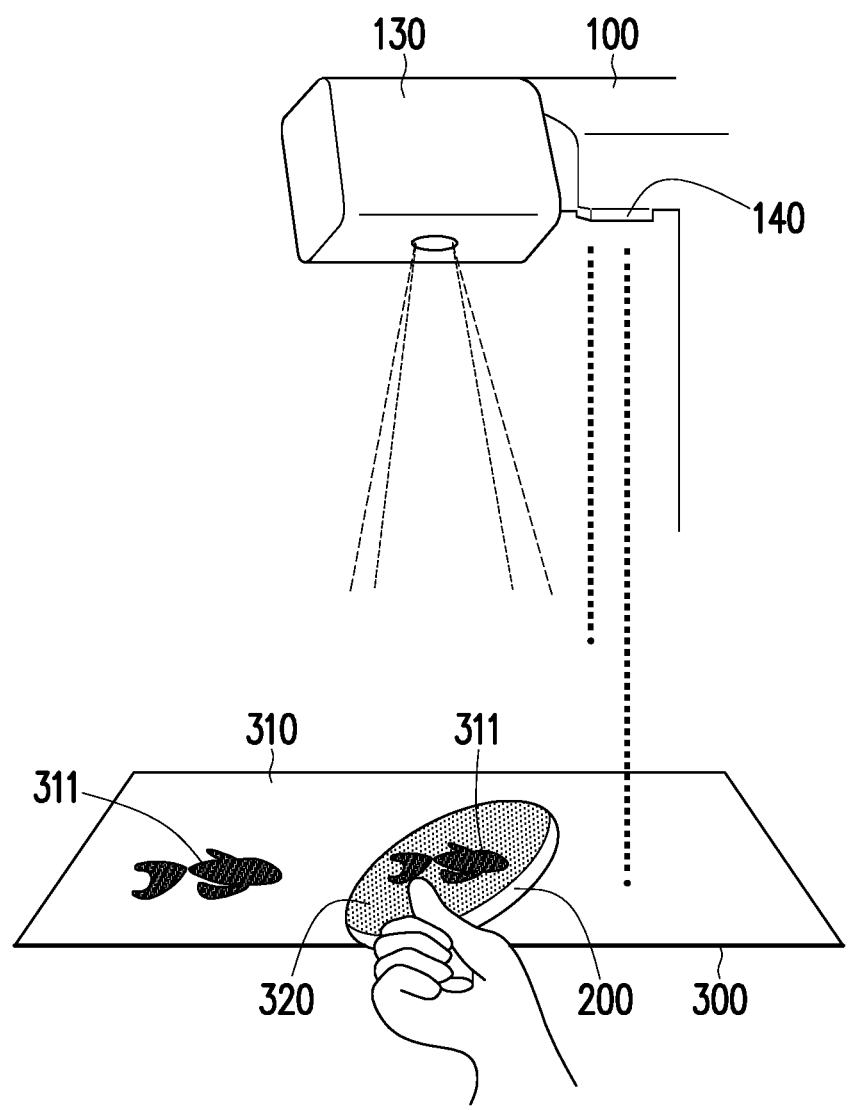
FIG. 5B illustrates a schematic diagram of the first virtual image and the second virtual image interacted with each other according to an embodiment of the invention.

FIG. 5B illustrates a schematic diagram of the first virtual image 310 and the second virtual image 320 interacted with each other according to an embodiment of the invention. As shown by FIG. 5B, after the projector 100 is activated by the user, the projector 100 can project a specific virtual scene for the user to play. For example, after the handheld device is detected by the depth camera 140, since the handheld device is in shape of a fishing net at the time, the projector 100 can correspondingly project the first virtual image 310 like the goldfish pond onto the virtual canvas 300 according to the handheld device in shape of the fishing net. The goldfish pond may include virtual objects like goldfishes and so on. The projector 100 can also project images like the fishing net onto the handheld device 200. The user holding the handheld device 200 is like holding the fishing net. The user may move the handheld device 200 towards the virtual canvas 300 on which the goldfish pond is projected. The virtual object in the virtual canvas 300 may interact with the handheld device 200. For example, when the handheld device 200 is rotated and moved towards the goldfish, the goldfish may be picked up by the handheld device 200. In addition, the first virtual image 310 in the virtual canvas 300 may also interact with the handheld device 200. For example, when handheld device 200 is moved horizontally, the handheld device 200 can generate a ripple on the water surface of the goldfish pond. In this way, the interactive projection system 10 can provide an immersive user experience for the user.

Specifically, it is assumed that the first virtual image 310 projected on the virtual canvas 300 is the goldfish, and the second virtual image 320 projected on the handheld device 200 is the fishing net. In that case, the first interactive mode is an interactive mode in which the goldfish can be picked up, and the second interactive mode is an interactive mode in which the goldfish cannot be picked up. When the processing module 110 executes the first interactive mode, if the handheld device 200 (i.e., the fishing net) is very close to the virtual object 311 (i.e., the goldfish) in the first virtual image 310 (i.e., the goldfish pond), the processing module 110 can transfer the virtual object 311 from the first virtual image 310 to the second virtual image 320. Thus, the virtual object 311 will appear like being picked up by the handheld device 200 from the virtual canvas 300. When the processing module 110 executes the second interactive mode, even if the handheld device 200 is very close to the virtual object 311 in the first virtual image 310, the processing module 110 will not transfer the virtual object 311 from the first virtual image 310 to the second virtual image 320. Instead, the handheld device 200 can only generate the ripple on the first virtual image 310.

In addition to the play experience of fishing goldfish, the interactive projection system 10 can also provide different types of play experiences for users such as cooking or whack-a-mole, and the invention is not limited thereto.

Figure 6:
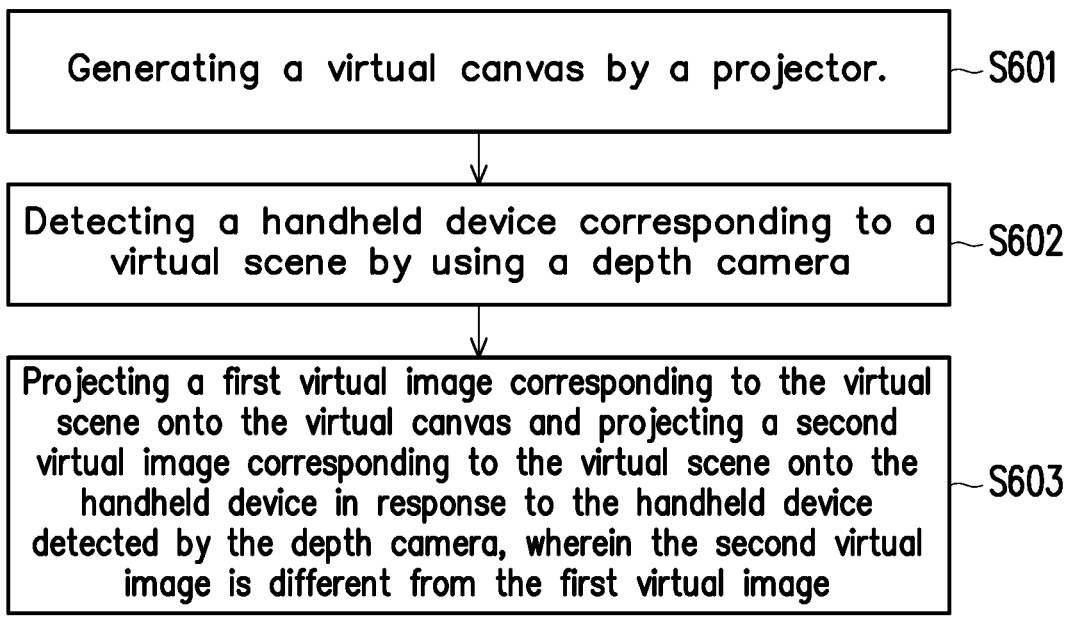
FIG. 6 illustrates a flowchart of an interactive projection method according to an embodiment of the invention.

FIG. 6 illustrates a flowchart of an interactive projection method according to an embodiment of the invention. Here, steps in FIG. 6 may be implemented by the interactive projection system 10 shown by FIG. 1. In step S601, a virtual canvas is generated by a projector. In step S602, a handheld device corresponding to a virtual scene is detected by using a depth camera. In step S603, a first virtual image corresponding to the virtual scene is projected onto the virtual canvas and a second virtual image corresponding to the virtual scene is projected onto the handheld device in response to the handheld device detected by the depth camera, wherein the second virtual image is different from the first virtual image.

In summary, the interactive projection system of the invention can detect the handheld device and project different virtual images separately on the virtual canvas and the handheld device. The interactive projection system can make the virtual image on the virtual canvas interact with the interactive projection system in response to the displacement or the rotation of the handheld device. With the interactive projection system of the invention, the projector can provide more types of virtual scenes for the user, and the user can interact with the virtual scene in a more diverse manner.

No element, act, or instruction used in the detailed description of disclosed embodiments of the invention should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items", individually or in conjunction with other items and/or other categories of items. Further, as used herein, the term "set" is intended to include any number of items, including zero. Further, as used herein, the term "number" is intended to include any number, including zero.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. An interactive projection system, comprising:
a handheld device, corresponding to a virtual scene; and
a projector, comprising:

a light source module, providing an illumination beam;

a projection lens module, converting the illumination beam into an image beam, and projecting the image beam to generate a virtual canvas;

a depth camera, detecting the handheld device;

a storage medium, storing a database associated with the virtual scene; and a processing module, coupled to the light source module, the projection lens module, the depth camera and the storage medium, wherein the processing module accesses the database in response to the handheld device detected by the depth camera, so as to project a first virtual image corresponding to the virtual scene onto the virtual canvas and project a second virtual image corresponding to the virtual scene onto the handheld device through the projection lens module, wherein the second virtual image is different from the first virtual image, wherein the processing module refreshes the first virtual image and the second virtual image according to at least one of a displacement and a rotation of the handheld device, and the processing module makes the first virtual image interact with the second virtual image in response to a difference between a first depth value of the virtual canvas and a second depth value of the handheld device less than a third threshold.

2. The interactive projection system according to claim 1, wherein the processing module enlarges or shrinks the second virtual image in response to a depth value variation of the handheld device.

3. The interactive projection system according to claim 2, wherein the processing module enlarges or shrinks the second virtual image in response to the depth value variation of the handheld device exceeding a first threshold.

4. The interactive projection system according to claim 1, wherein the processing module adjusts a shape of the second virtual image in response to the rotation of the handheld device.

5. The interactive projection system according to claim 4, wherein the processing module adjusts the shape of the second image in response to the rotation of the handheld device exceeding a second threshold.

6. The interactive projection system according to claim 1, wherein the processing module refreshes the first virtual image and the second virtual image according to a first interactive mode in response to a presence of the rotation of the handheld device, and the processing module refreshes the first virtual image and the second virtual image according to a second interactive mode different from the first interactive mode in response to an absence of the rotation of the handheld device.

7. The interactive projection system according to claim 6, wherein the first virtual image comprises a virtual object and the processing module transfers the virtual object from the first virtual image to the second virtual image based on the first interactive mode.

8. An interactive projection method, comprising:

generating a virtual canvas by a projector;

detecting a handheld device corresponding to a virtual scene by using a depth camera; and projecting a first virtual image corresponding to the virtual scene onto the virtual canvas and projecting a second virtual image corresponding to the virtual scene onto the handheld device in response to the handheld device detected by the depth camera, wherein the second virtual image is different from the first virtual image;

refreshing the first virtual image and the second virtual image according to at least one of a displacement and a rotation of the handheld device; and making the first virtual image interact with the second virtual image in response to a difference between a first depth value of the virtual canvas and a second depth value of the handheld device less than a third threshold.

9. The interactive projection method according to claim 8, further comprising:

enlarging or shrinking the second virtual image in response to a depth value variation of the handheld device.

10. The interactive projection method according to claim 9, further comprising:

enlarging or shrinking the second virtual image in response to the depth value variation of the handheld device exceeding a first threshold.

11. The interactive projection method according to claim 8, further comprising:

adjusting a shape of the second virtual image in response to the rotation of the handheld device.

12. The interactive projection method according to claim 11, further comprising:

adjusting the shape of the second image in response to the rotation of the handheld device exceeding a second threshold.

13. The interactive projection method according to claim 8, further comprising:

refreshing the first virtual image and the second virtual image according to a first interactive mode in response to a presence of the rotation of the handheld device; and refreshing the first virtual image and the second virtual image according to a second interactive mode different from the first interactive mode in response to an absence of the rotation of the handheld device.

14. The interactive projection method according to claim 13, wherein the first virtual image comprises a virtual object, and the interactive projection method further comprises:

transferring the virtual object from the first virtual image to the second virtual image based on the first interactive mode.

* * * * *